J. OBERMILLER.
WINDING REEL.
APPLICATION FILED JAN. 12, 1918.
1,292,361.
Patented Jan. 21, 1919.
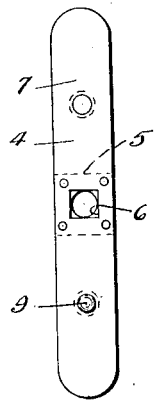
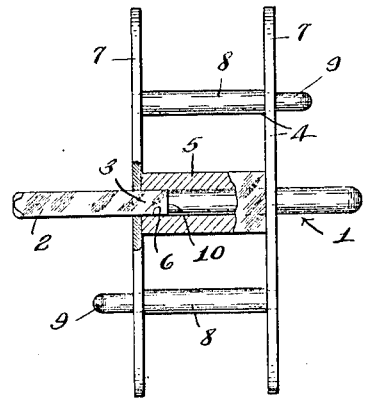
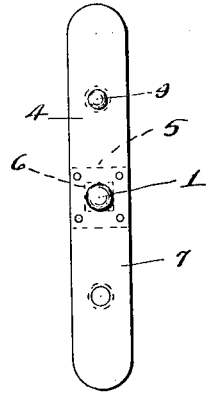
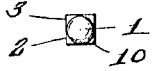
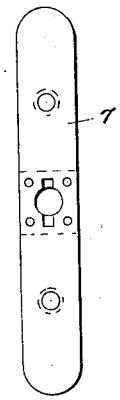
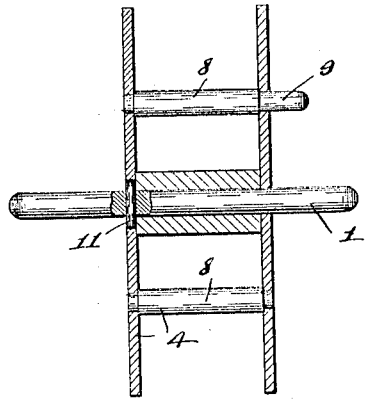
INVENTOR
Joseph Obermiller
BY
Parsons & Bodell
ATTORNEYS

UNITED STATES PATENT OFFICE.

JOSEPH OBERMILLER, OF SYRACUSE, NEW YORK.

WINDING-REEL.

1,292,361.　　Specification of Letters Patent.　　Patented Jan. 21, 1919.

Application filed January 12, 1918. Serial No. 211,547.

*To all whom it may concern:*

Be it known that I, JOSEPH OBERMILLER, a citizen of the United States, and a resident of Syracuse, in the county of Onondaga, and State of New York, have invented a certain new and useful Winding-Reel, of which the following is a specification.

This invention has for its object a winding reel for clothes lines and the like, which is particularly simple in construction, economical in manufacture and highly efficient and durable in use.

It consists in the novel features hereinafter set forth and claimed.

In describing this invention, reference is had to the accompanying drawings, in which like characters designate corresponding parts in all of the views.

Figure 1 is an elevation, partly in section of one form of my reel.

Figs. 2 and 3 are opposite side elevations thereof.

Fig. 4 is an end elevation of the axle.

Figs. 5, 6 and 7 are views similar to Figs. 1, 2 and 3 of a slightly modified form of my invention.

This reel comprises, generally, an axle having a handle and a reel mounted on the axle to rotate thereon, the reel and axle having means for clutching the reel to the axle so that the reel can be turned from the axle. Preferably, this means is brought into coaction by reversing the reel on the axle.

1 designates the axle, which is here shown as having a handle 2 in line with the spindle portion thereof, the axle having a non-circular or square portion 3 at the base of the handle.

4 is the reel proper which includes a hub 5 mounted on the axle and having a circular opening for receiving the axle, so that the reel may freely rotate on the axle and also having a non-circular or square countersink 6 at one end of the axle opening of the hub for receiving the complemental portion 3 of the handle in order to clutch the axle and reel together. The reel also includes side pieces 7 which are elongated in form and are secured to the hub in any suitable manner, and cross-pieces 8 located on diametrically opposite sides of the hub 5 and connecting the side pieces 7. The cross-pieces are provided with projections 9 which serve as handles for winding the reel. The cross-pieces 8 are secured to the side pieces 7 in any suitable manner and also the side pieces are mounted on the hub in any suitable manner.

The axle is also provided with a shoulder 10 at the abutting ends of the spindle portion of the axle and the handle 2 against which shoulder the reel abuts when mounted to turn freely on the axle.

In Figs. 5, 6 and 7 the non-circular portion of the handle is shown as formed by a transverse pin 11 through the axle which also forms the shoulder against which one side of the reel abuts when the reel is mounted to rotate freely on the axle. The reel is formed with notches at one end of the hub for receiving the ends of said pin.

This winding reel is particularly adapted for clothes lines, and in use the line is wound on the reel and in stringing the line the operator ties one end of the line to a post or other member and mounts the reel so that it can rotate freely on the axle, that is, with one side thereof abutting against the shoulder 10 or 11, and then walks away from the point the line is attached. The reel then rotates freely as the line unwinds. In taking down the line the reel is reversed end for end on the axle and the non-circular portion 3 or 11 of the axle is inserted in the non-circular countersink or notches in the reel and winds the reel by turning the handle. The fact that the reel is clutched to the axle permits the operator to place sufficient tension on the line to wind it snugly on the reel.

What I claim is:

A line reel comprising an axle having a handle in line therewith and a reel including a hub mounted on the axial, diametrically extending side pieces at the ends of the hub and cross pieces extending between the side pieces on opposite sides of the hub, the reel having the non-circular countersink at one end of the axle and the axle having a shoulder for entering the recess, substantially as and for the purpose described.

In testimony whereof I have hereunto signed my name, at Syracuse, in the county of Onondaga and State of New York, this 29th day of December, 1917.

JOSEPH OBERMILLER.

Copies of this patent may be obtained for five cents each, by addressing the "Commissioner of Patents, Washington, D. C."